(12) United States Patent
Mayhan

(10) Patent No.: US 6,885,973 B1
(45) Date of Patent: Apr. 26, 2005

(54) ALARM FACILITATOR AND METHOD FOR ANALYZING COMPUTER HARDWARE ALARMS

(75) Inventor: Heather M. Mayhan, Buford, GA (US)

(73) Assignee: Sprint Communications Company L.P., Overland Park, KS (US)

( * ) Notice: Subject to any disclaimer, the term of this patent is extended or adjusted under 35 U.S.C. 154(b) by 67 days.

(21) Appl. No.: 10/352,537

(22) Filed: Jan. 28, 2003

(51) Int. Cl.[7] .............................................. G06F 15/00
(52) U.S. Cl. .......................... 702/182; 702/58; 702/89; 702/90; 702/182; 709/227; 709/230; 379/37; 379/201.01; 370/231; 370/249; 714/21; 714/25; 714/30; 714/31
(58) Field of Search .............................. 702/58, 89, 90, 702/122, 182–186; 709/227, 230; 714/21–31; 379/37, 201.01; 370/231, 249; 345/734, 436

(56) References Cited

U.S. PATENT DOCUMENTS

| 3,824,597 | A | * | 7/1974 | Berg | .......................... 370/215 |
| 5,239,575 | A | * | 8/1993 | White et al. | ............ 379/106.06 |
| 5,784,551 | A | * | 7/1998 | De Leva et al. | ............... 714/13 |
| 5,991,264 | A | * | 11/1999 | Croslin | ........................ 370/225 |
| 2004/0022237 | A1 | * | 2/2004 | Elliott et al. | ................. 370/356 |

OTHER PUBLICATIONS

Hatonen et al., 'Knowledge Discovery from Telecommunication Network Alarm Databases', Dec. 1996, IEEE Article, pp. 115–122.*

* cited by examiner

Primary Examiner—Marc S. Hoff
Assistant Examiner—Elias Desta

(57) ABSTRACT

The present invention provides a system and method for analyzing hardware alarms in a telecommunications digital cross-connect system. The present invention also relates to a system and method for automating the process of analyzing hardware failures that cause path and parity alarms in a telecommunications digital cross-connect system used in a long distance network.

24 Claims, 8 Drawing Sheets

ALARM FACILITATOR AND METHOD FOR ANALYZING COMPUTER HARDWARE ALARMS

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention provides a system and method for analyzing hardware alarms in a telecommunications digital cross-connect system. The present invention also relates to a system and method for automating the process of analyzing hardware failures that cause path and parity alarms in a telecommunications digital cross-connect system used in a long distance network.

BACKGROUND OF THE INVENTION

In a telecommunications network, a control center monitors computer alarms and troubleshoots these alarms on a digital cross-connect system. The good portion of the alarms that the technicians are required to troubleshoot are path and parity alarms. These alarms may be caused by several types of hardware in the digital cross-connect system. Due to the nature of the alarms, the identification of a single hardware card as the probable cause of the alarm is very labor intensive, especially in the case where more than one network-outbound port is experiencing the alarm.

In order to troubleshoot these alarms manually, the control center must first document all ports in alarm. Technicians must query the system and document all mapping that exists on the outbound ports in alarm (up to 24 mappings per port). Once the mapping is identified, a signal path through the digital cross-connect system must be manually determined for each mapping that is found. Once all of these paths are identified, the paths must manually be compared to one another determine the hardware most common to all the signal paths. Depending upon how many ports are in alarm, the manual process of troubleshooting the alarms may take many hours.

SUMMARY OF THE INVENTION

Accordingly, in one of its aspects, the present invention provides a method for analyzing computer hardware alarms in a computing environment, the method comprises: receiving alarm data, utilizing the alarm data to determine what outbound ports are in alarm, determining what inbound ports are mapped to each outbound port in alarm and determining a hardware path between each outbound port in alarm and each inbound port mapped to the outbound port in alarm.

In another one of its aspects, the present invention provides a method for analyzing computer hardware alarms in a computing environment, the method comprises: receiving alarm data, utilizing the alarm data to determine what outbound ports are in alarm, determining what inbound ports are mapped to each outbound port in alarm, determining a hardware path between each outbound port in alarm and each inbound port mapped to the outbound port in alarm and comparing the hardware paths to determine hardware most common to the hardware paths.

In yet another one of its aspects, the present invention provides a computer readable medium having a method for analyzing computer comprising: receiving alarm data, utilizing the alarm data to determine what outbound ports are in alarm, determining what inbound ports are mapped to each outbound port in alarm and determining a hardware path between each outbound port in alarm and each inbound port mapped to the outbound port in alarm.

In another aspect, the present invention provides a method for analyzing computer hardware alarms in a computing environment, the method comprises: receiving the specified alarm status to be analyzed, capturing the alarm log based on the specified alarm status, receiving the specified type of alarm to be analyzed, capturing the alarm data from the alarm log based on the specified type of alarm, utilizing the alarm data to determine what outbound ports are in alarm, determining the mapping for each outbound port in alarm, determining what inbound ports are mapped to each outbound port in alarm based on the mapping for each outbound port in alarm and determining a hardware path between each outbound port in alarm and each inbound port mapped to the outbound port in alarm.

In still another one of its aspects, the present invention provides system for analyzing computer hardware alarms in a computing environment, the system comprises: a means for utilizing the alarm data to determine what outbound ports are in alarm; a means for determining what inbound ports are mapped to each outbound port in alarm; and a means for determining a hardware path between each outbound port in alarm and each inbound port mapped to the outbound port in alarm.

And in still another one of its aspects, the present invention provides an interface for analyzing computer hardware alarms, the interface comprising computer readable program code devices for: receiving at least one request to determine a list of possible pieces of hardware that could be emitting the alarms from a requester; in response to the request, determining computer hardware that could be emitting the alarms; and returning to the requester a list of possible hardware that could be emitting the alarms.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means, instrumentalities and combinations particularly pointed out in the appended claims

BRIEF DESCRIPTION OF THE DRAWING

The present invention is described in detail below with reference to the attached drawing figures, wherein.

DETAILED DESCRIPTION OF THE INVENTION

The present invention provides a system and method for analyzing hardware alarms in a telecommunications cross-connect system.

Various telecom technical terms are used throughout this disclosure. A definition of such terms may be found in: H. Newton, *Newton's Telecom Dictionary*, 18$^{th}$ Updated and Expanded Edition (2002). These definitions are intended to provide clearer understanding of the ideas disclosed herein and are in no way intended to limit the scope of the present invention. The definitions and terms should be interpreted broadly and liberally to the extent allowed by the art and the meaning of the words offered in the above-cited reference.

Figure 1:
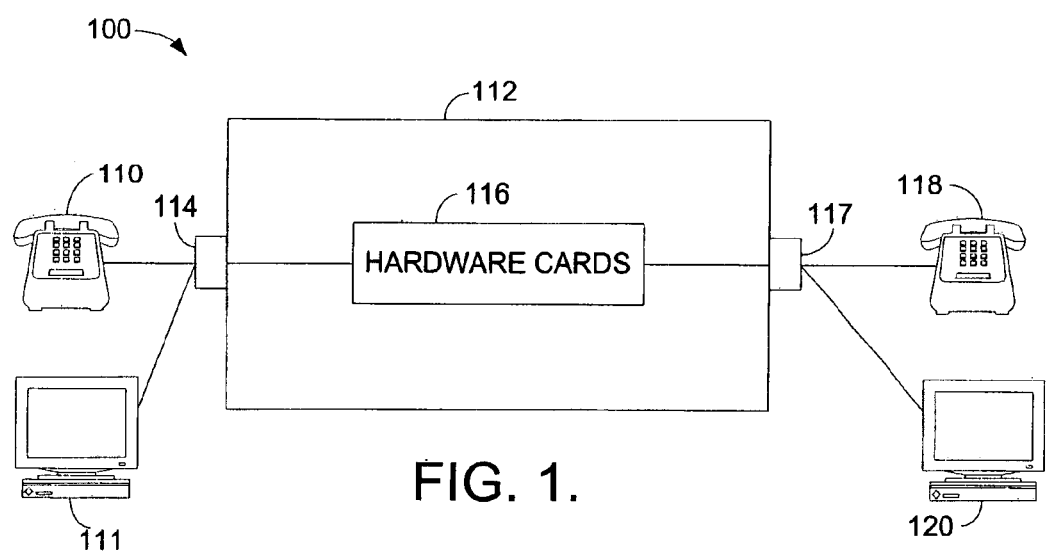
FIG. 1 is an exemplary telecommunications digital cross-connect system.

Turning now to FIG. 1, an exemplary digital cross-connect system for practicing the embodiment of the present invention is depicted and referenced generally by numeral 100. Telephone calls 110, including long distance telephone calls and network transmissions 111 are placed and are converted into signal data. The signal data travels to digital cross-connect system (DCS) 112. DCS 112 provides direct and cross-connections of telephone calls and network transmissions. At DCS 112, signal data enters via inbound port 114 and is "cross-connected." Types of digital cross-connect systems that may be used include, but are not limited to, digital cross-connect systems sold under the name of Alcatel® CS1L and Alcatel® CS1. After entering via inbound port 114, the data signal travels through a series of hardware/cards 116 before reaching the desired outbound port 117. Hardware/cards 116, may include, but are not limited to, Unit Controller (UC) cards, Digital Matrix Multiplexing (DMUX) cards, Digital Matrix Large (DML) cards and Digital Matrix Interface (DMIF) cards.

Signal data degradation may occur as the signal data travels through hardware/cards 116 of cross-connecting system 112. If the signal data is degraded, the system will be down (i.e. the caller cannot use the Internet and/or cannot make outbound calls). These alarms affect customer data because they are an indication of bad signal data integrity across cross-connect system 112. If the signal data degradation in hardware/cards 116 occurs, technicians are notified of the degradation by an alarm at outbound port 117. Two of the most common alarms in the hardware/cards 116 in cross-connect system 112 include path and parity alarms. A path alarm occurs when there is a problem or error in the physical route a telecommunication signal data follows. Examples of things that may cause a path alarm include, but are not limited to, a disconnection or a blown cable fuse in the power supply. A parity alarm occurs when the check character or bit appended to the original contents of a data stream is changed from the original transmission while traveling through hardware/cards 116 of the DCS 112. The following method and system for analyzing path and parity alarms saves the control center technician time in troubleshooting one of the most common alarms that occur in a digital cross-connect system.

Figure 2A:
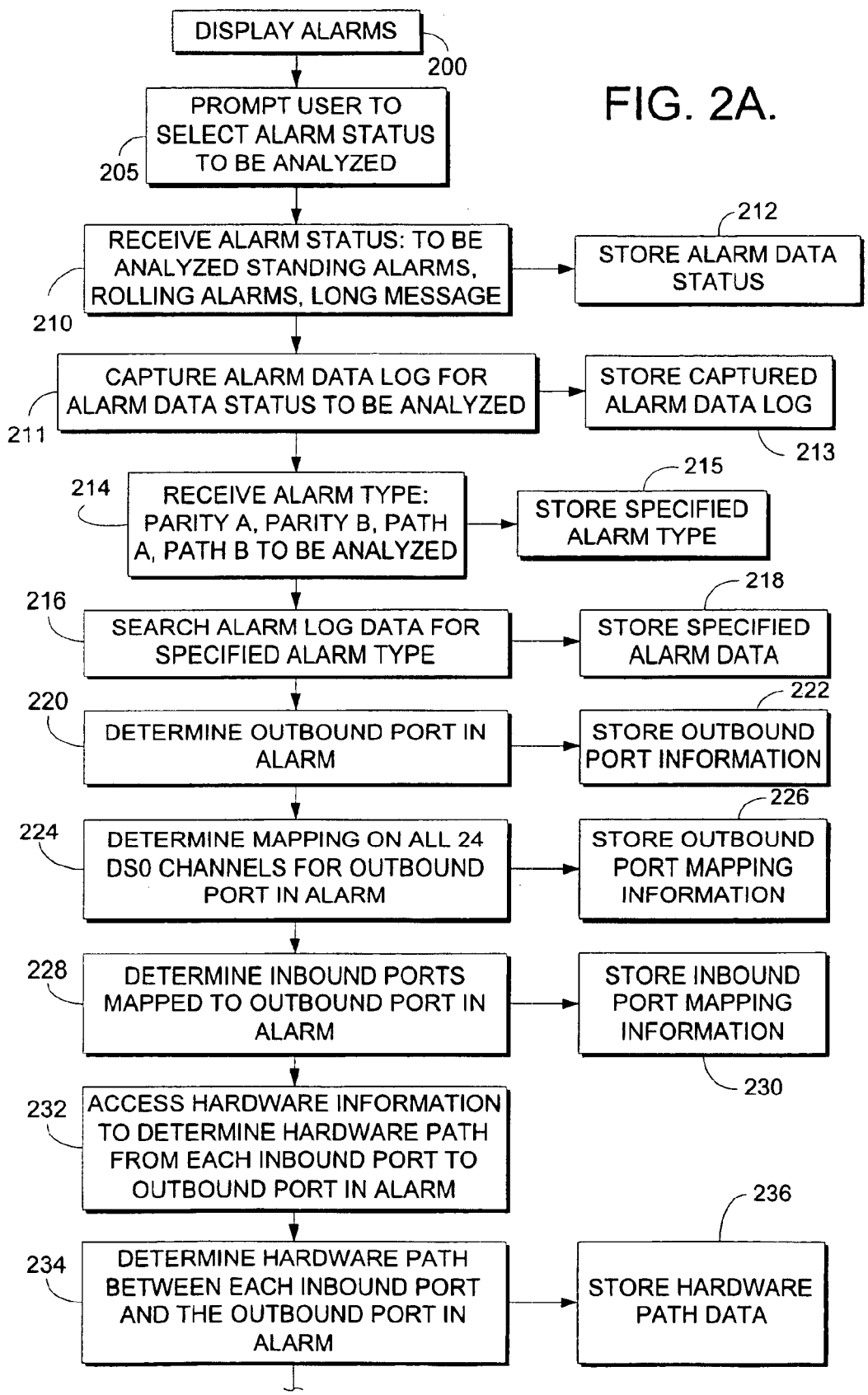
FIG. 2 is an exemplary method for analyzing computer hardware alarms in a digital cross-connect system.
Figure 2B:
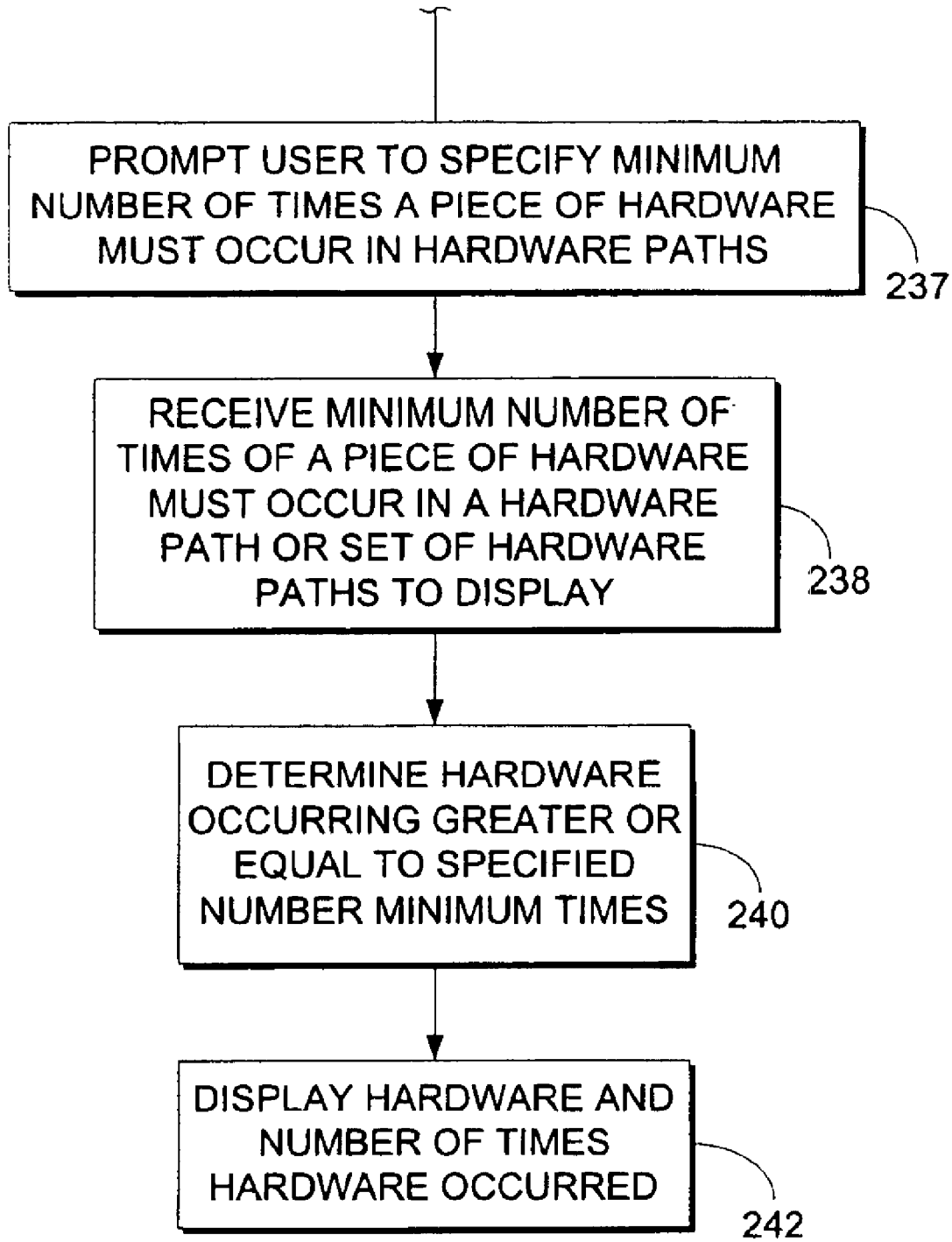
Figure 3:
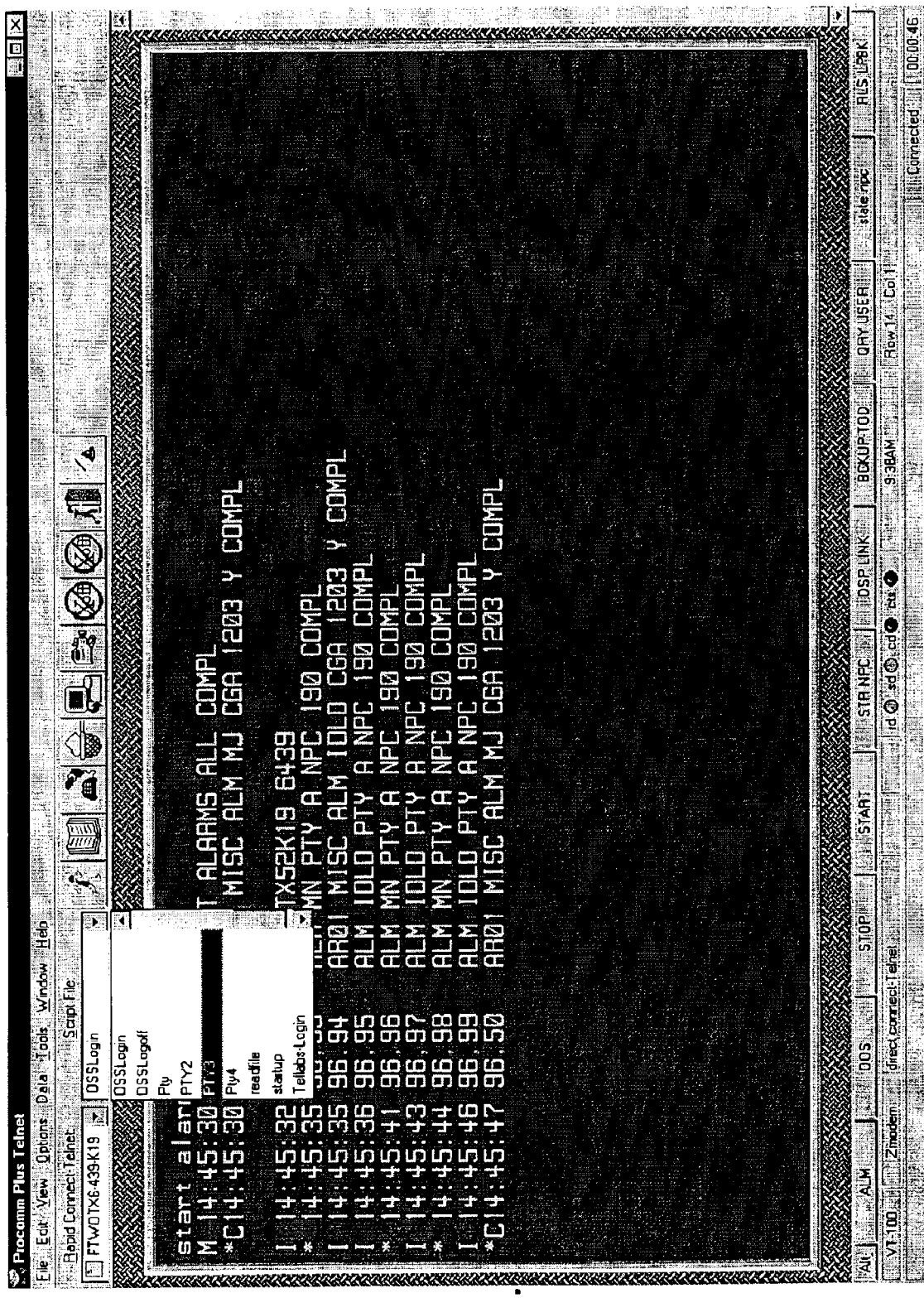
FIG. 3 is an exemplary screen of alarms in a digital cross-connect system.
Figure 4:
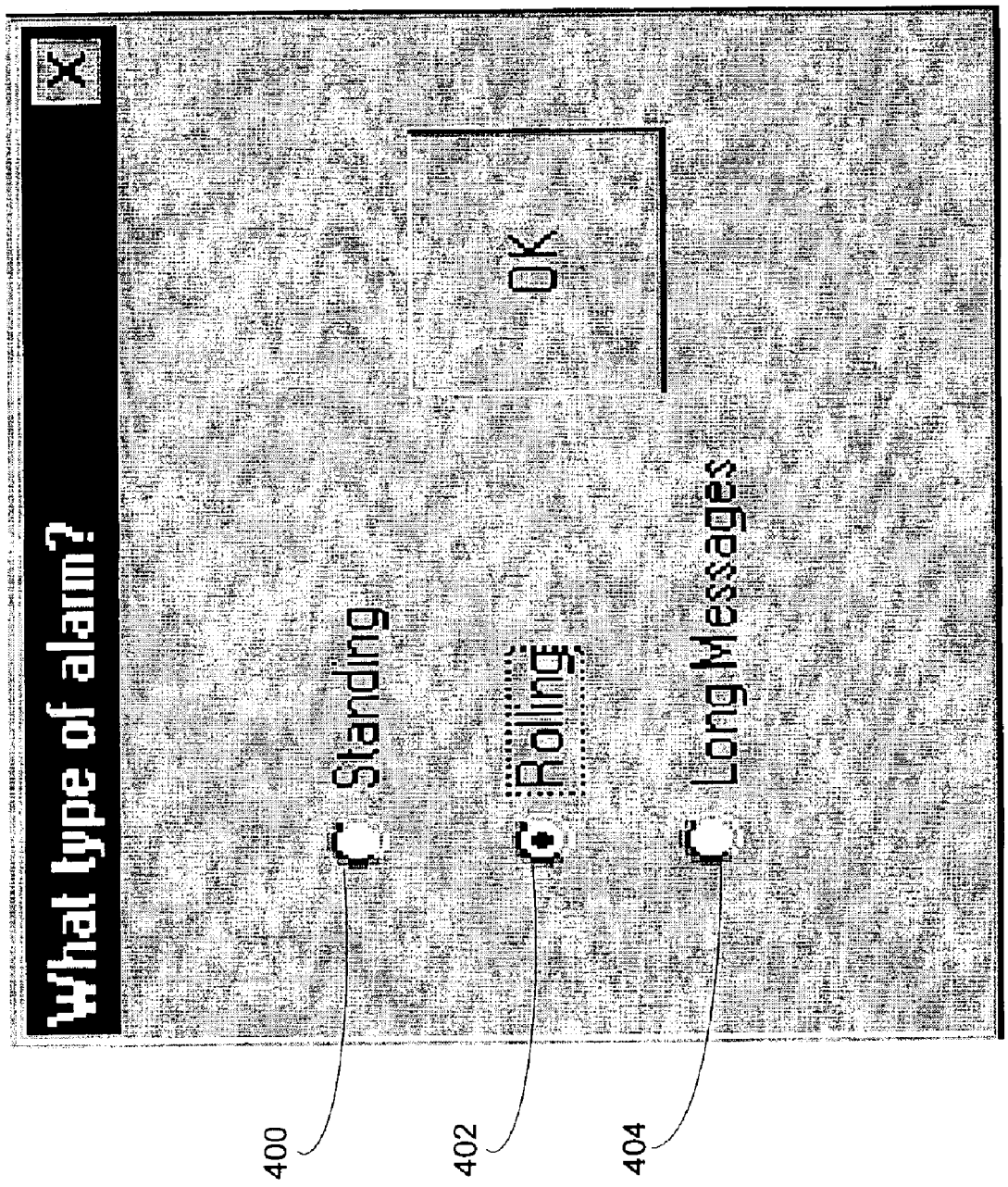
FIG. 4 is an exemplary screen of the types of alarm status that may be analyzed in a digital cross-connect system.

Turning now to FIG. 2, an exemplary process for analyzing hardware alarms in a digital cross-connect system to determine in what piece of hardware/cards the signal data degradation occurred is described. In step 200, the system displays alarms in the DCS system. This is illustrated by the exemplary screen of 3. In step 205, the system then prompts the user to select the alarm status to be analyzed. FIG. 4 is an exemplary screen of the types of alarm status that may be analyzed. The alarm status to be analyzed may include, but is not limited to, standing alarms 400, rolling alarms 402, or long messages 404. Standing alarms are alarms posted to the alarm log but have not cleared. Rolling alarms are alarms that post to the alarm log, are cleared shortly thereafter, and are posted again to the alarm log. Examples of a rolling alarm are:

*09:48:02 96,55 ALM MN PTY A NPC 190 COMP; and
I09:48:03 96,56 ALM IDLD PTY A NPC 190 COMPL.

The system receives the user's selection of alarm status to be analyzed in step 210, and stores the alarm status in step 212. The alarm status and other information obtained throughout this description may be stored in a table, text file or any other acceptable manner. In step 211, the system captures the alarm data log for the specified alarm status received and stores the captured alarm data log in step 213.

Figure 5:
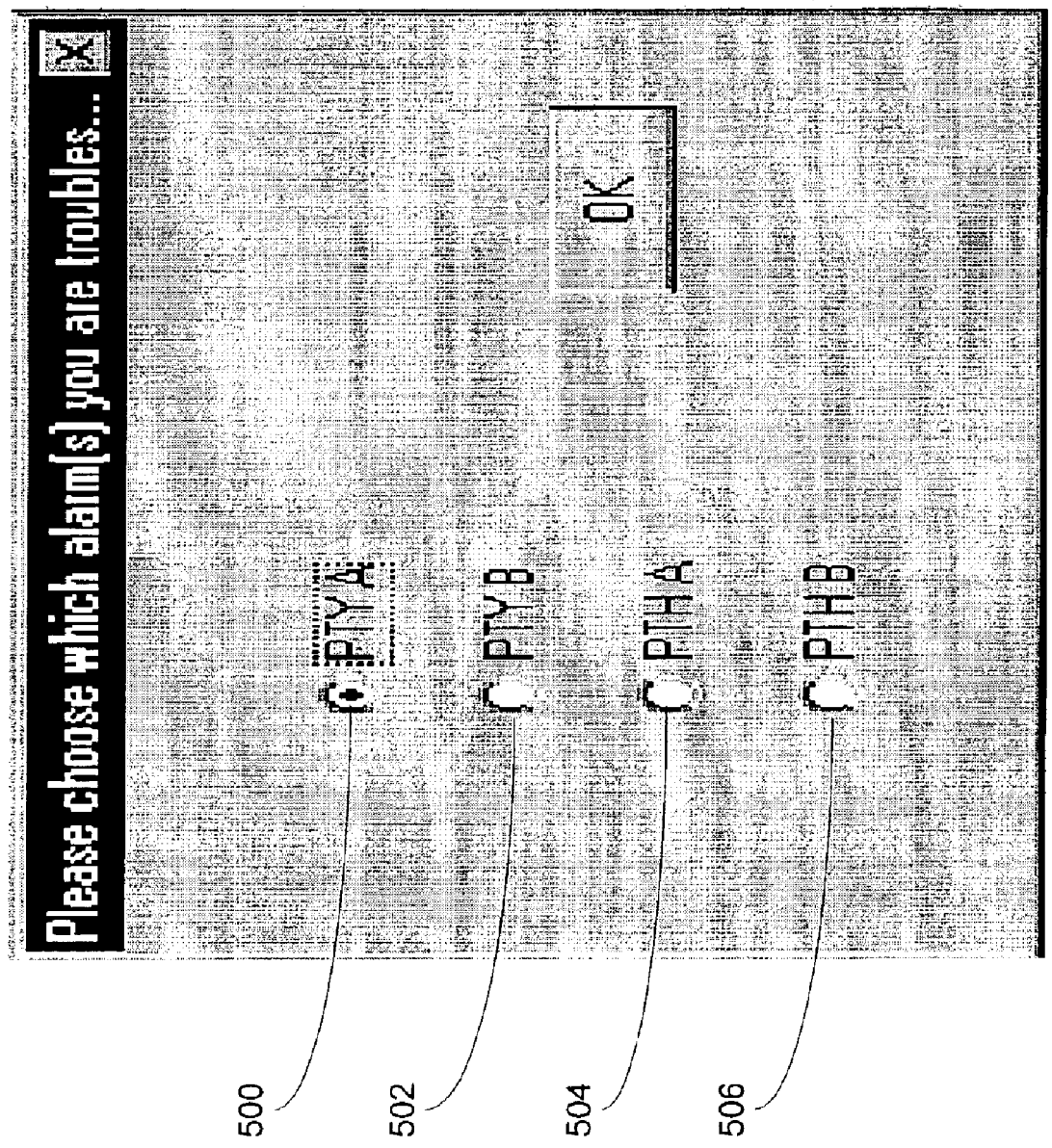
FIG. 5 is an exemplary screen of the types of alarms that may be analyzed.

The user then is prompted to select the type of alarm to be analyzed. FIG. 5 is an exemplary screen of the types of alarms that may be analyzed. The types of alarms to be analyzed, may include, but is not limited to, Parity A 500, Parity B 502, Path A 504 or Path B 506. Path and parity alarms in the DCS may occur on Matrix A or Matrix B. A matrix moves calls from one input to the desired output. In the DCS, the matrices are on separate physical shelves for moving calls and are labeled A and B.

The system receives the type of alarm to be analyzed in step 214 and stores the specified alarm type in step 215. In step 216, the system accesses the alarm data log stored in step 213 for the specified alarm type to determine the specified alarm data to be analyzed. The specified alarm data then is stored in a table in step 218.

In step 220, the system analyzes the specified alarm data stored in step 218 to determine the outbound port(s) in alarm. The outbound port information determined in step 220 is stored in a table in step 222. Using the above example of a rolling alarm, the system determines outbound port 190 is in alarm. In step 224, the system determines the mapping on all 24 DS0 channels for the mapping of any and all outbound ports having the specified trouble. The following is an example of mapping for outbound port 190 that is in alarm:

| 1167017 | 1167018 | 1167019 | 1167020 | 0000000 | 0000000 | 0000000 |
|---------|---------|---------|---------|---------|---------|---------|
| 0000000 |         |         |         |         |         |         |
| 0000000 | 0000000 | 0000000 | 0000000 | 0000000 | 0000000 | 0000000 |
| 0000000 |         |         |         |         |         |         |
| 0000000 | 0000000 | 0000000 | 0000000 | 0000000 | 0000000 | 0000000 |
| 0000000 |         |         |         |         |         |         |

Each set of seven digits represents one of the 24 channels of the DS0. In this example, only four channels are mapped. In other cases, all 24 channels may be mapped and may be mapped to the same or different inbound ports. Furthermore, if additional outbound ports were in alarm besides just outbound port 190, the system will determine the mapping on all 24 DS0 channels for any additional outbound ports in alarm. In step 226, the system stores the outbound port mapping information.

In step 228, the system analyzes the outbound porting mapping information stored in step 226 to determine the inbound ports mapped to the outbound port(s) in alarm. Using the above example, all four channels are mapped to inbound 1167. The inbound port information is stored in step 230.

In step 232, the system accesses hardware information and in step 234, utilizes the hardware information to determine each piece of hardware (hardware path) the data travels through from each inbound port to the outbound port(s) in alarm. This hardware information may be the form of a table, chart or stored information regarding the hardware setup for a particular DCS system. For example, using the unit chart of Table 1, the system determines the hardware/cards of the hardware path the signal data has traveled through from in bound port 1167 to outbound port 190.

TABLE 1

| UNIT | Unit Controller Cards A/B | Port Number | DMIF A/B | Inbound DML A | Inbound DML B | Outbound DML A | Outbound DML B |
|---|---|---|---|---|---|---|---|
| 1 | 1,2 | 1–28 | 1,2 | 1,3 | 2,4 | 1,7 | 2,8 |
| 2 | 3,4 | 29–56 | 1,2 | 1,3 | 2,4 | 1,7 | 2,8 |
| 3 | 5,6 | 57–84 | 1,2 | 1,3 | 2,4 | 1,7 | 2,8 |
| 4 | 7,8 | 85–112 | 1,2 | 1,3 | 2,4 | 1,7 | 2,8 |
| 5 | 9,10 | 113–140 | 1,2 | 1,3 | 2,4 | 1,7 | 2,8 |
| 6 | 11,12 | 141–168 | 1,2 | 1,3 | 2,4 | 1,7 | 2,8 |
| 7 | 13,14 | 169–196 | 3,4 | 1,3 | 2,4 | 1,7 | 2,8 |
| 8 | 15,16 | 197–224 | 3,4 | 1,3 | 2,4 | 1,7 | 2,8 |
| 9 | 17,18 | 225–252 | 3,4 | 1,3 | 2,4 | 1,7 | 2,8 |
| 10 | 19,20 | 253–280 | 3,4 | 1,3 | 2,4 | 1,7 | 2,8 |
| 11 | 21,22 | 281–308 | 3,4 | 1,3 | 2,4 | 1,7 | 2,8 |
| 12 | 23,24 | 309–336 | 3,4 | 1,3 | 2,4 | 1,7 | 2,8 |
| 13 | 25,26 | 337–364 | 5,6 | 1,3 | 2,4 | 1,7 | 2,8 |
| 14 | 27,28 | 365–392 | 5,6 | 1,3 | 2,4 | 1,7 | 2,8 |
| 15 | 29,30 | 393–420 | 5,6 | 1,3 | 2,4 | 1,7 | 2,8 |
| 16 | 31,32 | 421–448 | 5,6 | 1,3 | 2,4 | 1,7 | 2,8 |
| 17 | 33,34 | 449–476 | 5,6 | 1,3 | 2,4 | 1,7 | 2,8 |
| 18 | 35,36 | 477–504 | 5,6 | 1,3 | 2,4 | 1,7 | 2,8 |
| 19 | 37,38 | 505–532 | 7,8 | 1,3 | 2,4 | 1,7 | 2,8 |
| 20 | 39,40 | 533–560 | 7,8 | 1,3 | 2,4 | 1,7 | 2,8 |
| 21 | 41,42 | 561–588 | 7,8 | 1,3 | 2,4 | 1,7 | 2,8 |
| 22 | 43,44 | 589–616 | 7,8 | 1,3 | 2,4 | 1,7 | 2,8 |
| 23 | 45,46 | 617–644 | 7,8 | 1,3 | 2,4 | 1,7 | 2,8 |
| 24 | 47,48 | 645–672 | 7,8 | 1,3 | 2,4 | 1,7 | 2,8 |
| 25 | 49,50 | 673–700 | 9,10 | 5,7 | 6,8 | 3,5 | 4,6 |
| 26 | 51,52 | 701–728 | 9,10 | 5,7 | 6,8 | 3,5 | 4,6 |
| 27 | 53,54 | 729–756 | 9,10 | 5,7 | 6,8 | 3,5 | 4,6 |
| 28 | 55,56 | 757–784 | 9,10 | 5,7 | 6,8 | 3,5 | 4,6 |
| 29 | 57,58 | 785–812 | 9,10 | 5,7 | 6,8 | 3,5 | 4,6 |
| 30 | 59,60 | 813–840 | 9,10 | 5,7 | 6,8 | 3,5 | 4,6 |
| 31 | 61,62 | 841–868 | 11,12 | 5,7 | 6,8 | 3,5 | 4,6 |
| 32 | 63,64 | 869–896 | 11,12 | 5,7 | 6,8 | 3,5 | 4,6 |
| 33 | 65,66 | 897–924 | 11,12 | 5,7 | 6,8 | 3,5 | 4,6 |
| 34 | 67,68 | 925–952 | 11,12 | 5,7 | 6,8 | 3,5 | 4,6 |
| 35 | 69,70 | 953–980 | 11,12 | 5,7 | 6,8 | 3,5 | 4,6 |
| 36 | 71,72 | 981–1008 | 11,12 | 5,7 | 6,8 | 3,5 | 4,6 |
| 37 | 73,74 | 1009–1036 | 13,14 | 5,7 | 6,8 | 3,5 | 4,6 |
| 38 | 75,76 | 1037–1064 | 13,14 | 5,7 | 6,8 | 3,5 | 4,6 |
| 39 | 77,78 | 1065–1092 | 13,14 | 5,7 | 6,8 | 3,5 | 4,6 |
| 40 | 79,80 | 1093–1120 | 13,14 | 5,7 | 6,8 | 3,5 | 4,6 |
| 41 | 81,82 | 1121–1148 | 13,14 | 5,7 | 6,8 | 3,5 | 4,6 |
| 42 | 83,84 | 1149–1176 | 13,14 | 5,7 | 6,8 | 3,5 | 4,6 |
| 43 | 85,86 | 1177–1204 | 15,16 | 5,7 | 6,8 | 3,5 | 4,6 |
| 44 | 87,88 | 1205–1232 | 15,16 | 5,7 | 6,8 | 3,5 | 4,6 |
| 45 | 89,90 | 1233–1260 | 15,16 | 5,7 | 6,8 | 3,5 | 4,6 |
| 46 | 91,92 | 1261–1288 | 15,16 | 5,7 | 6,8 | 3,5 | 4,6 |
| 47 | 93,94 | 1289–1316 | 15,16 | 5,7 | 6,8 | 3,5 | 4,6 |
| 48 | 95,96 | 1317–1344 | 15,16 | 5,7 | 6,8 | 3,5 | 4,6 |

Thus, in the CS1L network has the following hardware path: INB 1167 UC 83 DMIF 13 UP DML 7 DMUX 1 DMIF 03 UC 13 OTB 0190 LW. The rolling parity A alarm occurring from inbound port 1167 to outbound port 190 may be occurring in one of the pieces of hardware listed above (Inbound Unit Controller Card 83, Inbound DMIF card 13, Digital Matrix Large Card 7, etc). For example, using the chart of Table 1, the system would determine that inbound port 1167 on Matrix A is mapped to unit controller card 83, DMIF card 13 and DML card 5 or 7. Outbound port 190 is mapped to DMIF card 03, UC card 13 and DML card 1 or 7. The DML card in the hardware path for inbound 1167 and outbound port 190 is 7 because it is common to both the inbound and outbound port. In this example, the DMUX card 1 is always in the hardware path for alarms occurring on Matrix A and DMUX card 2 for alarms on Matrix B. Thus, DMUX 1 is part of the hardware path for this example. If more than one outbound port was in alarm, or if outbound port 190 was mapped to more than one other inbound port, then the number of paths and possible hardware causing the alarm will increase. The system stores the hardware path information in step 236.

Figure 6:
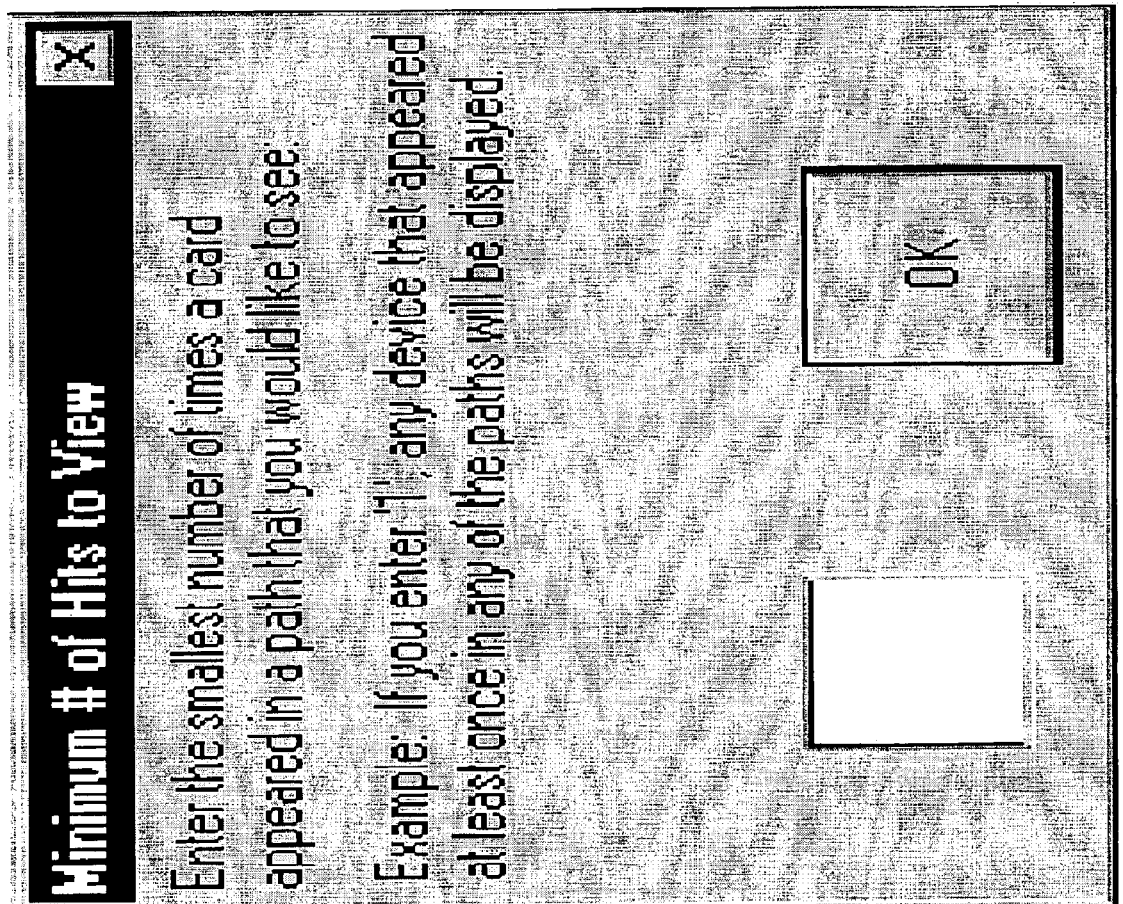
FIG. 6 is an exemplary screen of a prompt requiring a user to specify the minimum number of times a piece of hardware must appear in the hardware paths to be added to a list of suspect hardware.

It is necessary to identify the hardware that is most common to the all of the identified hardware paths, especially when there is more than one outbound port in alarm or more than one inbound port mapped to the outbound port in alarm. In step 237, the system prompts the user to specify the minimum number of times a piece of hardware should appear in the different paths to be added to a list of suspect hardware. The prompt is illustrated in FIG. 6. In step 238, the system receives the user's input specifying the minimum number of times a piece of hardware should appear.

Figure 7:
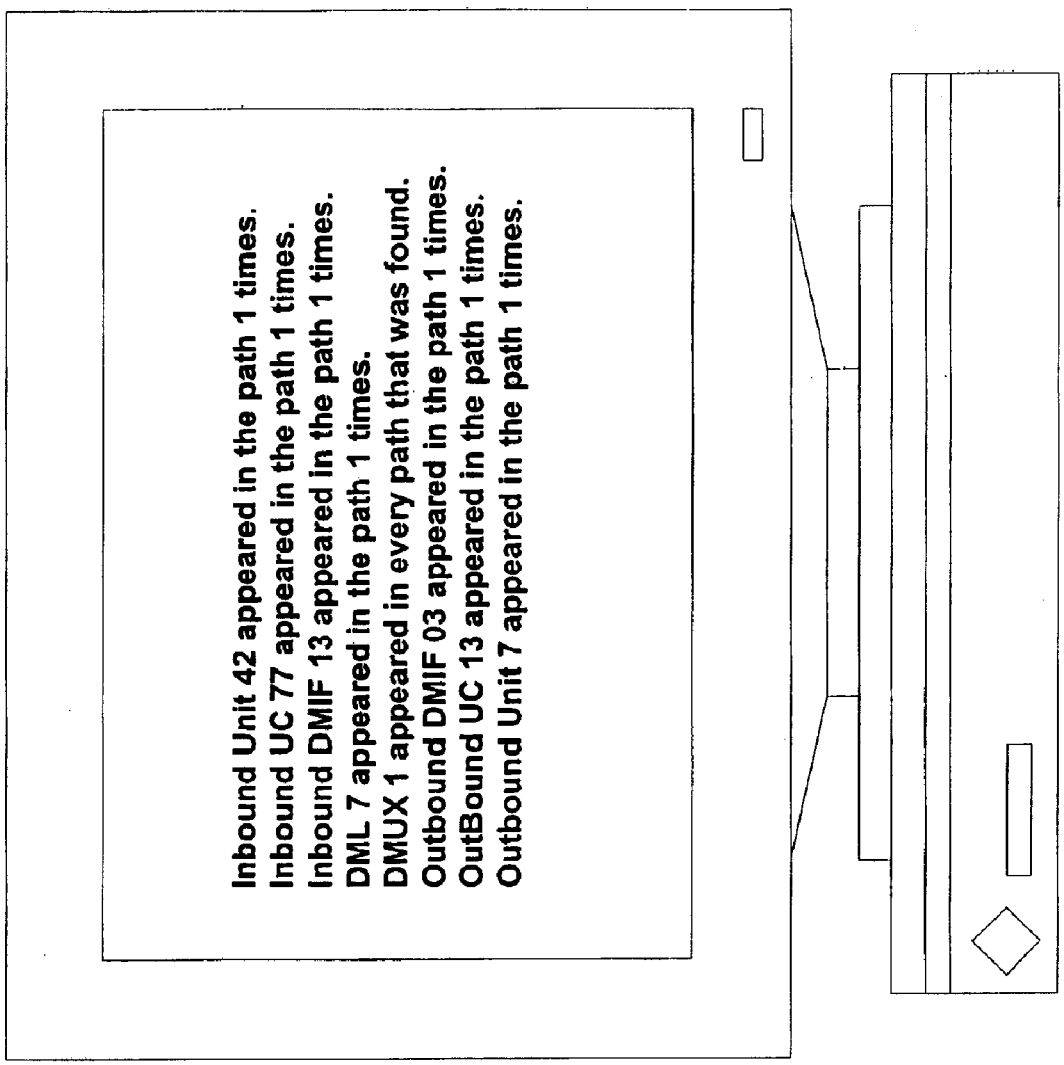
FIG. 7 is an exemplary screen displaying a list of suspect hardware.

In step 240, the system then analyzes the hardware paths and determines any pieces of hardware that occur the minimum number of specified times. In step 242, the system displays all hardware that occurs the minimum number of specified times. Continuing the above example, the user specifies the minimum number of times a piece of hardware should occur is once. An exemplary screen of hardware that occurs at least once in this hardware path/set of hardware paths is shown in FIG. 7.

The present invention provides a system and method for analyzing hardware alarms in a telecommunications digital cross-connect system. The present invention also relates to system and method for automating the process of analyzing hardware failures that cause path and parity alarms in a telecommunications digital cross-connect system such as, but not limited to, digital cross-connect systems sold under the name of Alcatel® CS1 and CS1L systems.

From the foregoing, it will be seen that this invention is one well adapted to attain all the ends and objects hereinabove set forth, together with other advantages which are obvious and which are inherent to the method.

It will be understood that certain features and subcombinations are of utility and may be without reference to other features and subcombinations. This is contemplated by and is within the scope of the claims.

I claim:

1. A method for analyzing computer hardware alarms in a digital cross-connect system in a computing environment, the method comprising:

receiving alarm data;

utilizing the alarm data to determine what outbound ports in a digital cross-connect system are in alarm;

determining what inbound ports in the digital cross-connect system are mapped to each outbound port in alarm; and determining a hardware path between each outbound port in alarm and each inbound port mapped to the outbound port in alarm.

2. A computer readable medium comprising the method of claim 1.

3. The method of claim 1, further comprising:

comparing the hardware paths to determine hardware most common to the hardware paths.

4. The method of claim 1, wherein the alarm data is a path alarm.

5. The method of claim 1, wherein the alarm data is a parity alarm.

6. The method of claim 1, further comprising:

prompting the user to specify the alarm status to be analyzed.

7. The method of claim 6, further comprising:

receiving the alarm status to be analyzed.

8. The method of claim 6, wherein the alarm status to be reviewed is one of standing alarms, rolling alarms and long messages.

9. The method of claim 7, further comprising:

capturing the alarm log based on the specified alarm status.

10. The method of claim 9, further comprising:

prompting the user to specify the type of alarm to be analyzed.

11. The method of claim 10, further comprising:

receiving the specified type of alarm to be analyzed.

12. The method of claim 10, wherein the type of alarm to be analyzed is one of parity on the A matrix, parity on the B matrix, path on the A matrix or path on the B matrix.

13. The method of claim 11, further comprising:

searching the alarm log for alarm data based on the specified alarm type.

14. The method of claim 1, further comprising:

prompting a user to specify the minimum number of times a piece of hardware must be present in a set of hardware paths to be reported.

15. The method of claim 1, further comprising:

determining the number of times a piece of hardware is present in a set of hardware paths.

16. The method of claim 14, further comprising:

determining whether a piece of hardware qualifies to be reported based on the specified minimum number of times.

17. The method of claim 15, wherein the system displays the pieces of hardware present in a set of hardware paths based on user specification.

18. The method of claim 16, wherein the system displays the pieces of hardware that qualify to be reported based on the specified minimum number of times.

19. The method of claim 1, wherein the hardware alarms are occurring on a digital cross-connect system.

20. The method of claim 19, wherein the digital cross-connect system is one of digital cross-connect systems sold under the name of Alcatel® CS1 and Alcatel® CS1L system.

21. A method for analyzing computer hardware alarms in a computing environment, the method comprising:

receiving the specified alarm status to be analyzed;

capturing the alarm log based on the specified alarm status;

receiving the specified type of alarm to be analyzed;

capturing the alarm data from the alarm log based on the specified type of alarm;

utilizing the alarm data to determine what outbound ports in a digital cross-connect system are in alarm;

determining the mapping for each outbound port in alarm;

determining what inbound ports in the digital cross-connect system are mapped to each outbound port in alarm based on the mapping for each outbound port in alarm; and determining a hardware path between each outbound port in alarm and each inbound port mapped to the outbound port in alarm.

22. A computer-readable medium comprising the method of claim 21.

23. A system for analyzing computer hardware alarms in a computing environment, the system comprising:

means for utilizing the alarm data to determine what outbound ports in a digital cross-connect system are in alarm;

means for determining what inbound ports in the digital cross-connect system are mapped to each outbound port in alarm; and means for determining a hardware path between each outbound port in alarm and each inbound port mapped to the outbound port in alarm.

24. An interface for analyzing computer hardware alarms, the interface comprising computer readable program code devices for:

receiving at least one request to determine a list of possible hardware cards in a digital cross-connect system that could be emitting the alarms from a requester;

in response to the request, determining computer hardware in a digital cross-connect system that could be emitting the alarms; and returning to the requester a list of possible hardware in the digital cross-connect system that could be emitting the alarms.

* * * * *